US012169004B2

(12) United States Patent
Pryor

(10) Patent No.: US 12,169,004 B2
(45) Date of Patent: Dec. 17, 2024

(54) CONTROL SYSTEM AND METHOD TO DETECT CLUTCH SLIPPAGE

(71) Applicant: THE BOEING COMPANY, Chicago, IL (US)

(72) Inventor: Thomas W. Pryor, Seattle, WA (US)

(73) Assignee: The Boeing Company, Chicago, IL (US)

( * ) Notice: Subject to any disclaimer, the term of this patent is extended or adjusted under 35 U.S.C. 154(b) by 757 days.

(21) Appl. No.: 17/365,800

(22) Filed: Jul. 1, 2021

(65) Prior Publication Data

US 2022/0018402 A1 Jan. 20, 2022

Related U.S. Application Data

(60) Provisional application No. 63/053,355, filed on Jul. 17, 2020.

(51) Int. Cl.
| | |
|---|---|
| *F16D 48/06* | (2006.01) |
| *B64C 13/30* | (2006.01) |
| *B64C 13/50* | (2006.01) |

(52) U.S. Cl.
CPC ............. *F16D 48/06* (2013.01); *B64C 13/30* (2013.01); *B64C 13/50* (2013.01); *F16D 2500/70426* (2013.01)

(58) Field of Classification Search
CPC ........... F16D 48/06; F16D 2500/70426; F16D 2500/30415; F16D 2500/30426; F16D 2500/1045; B64C 13/30; B64C 13/50
See application file for complete search history.

(56) References Cited

U.S. PATENT DOCUMENTS

| | | | |
|---|---|---|---|
| 4,605,107 A | 8/1986 | Hallidy et al. | |
| 9,440,800 B1* | 9/2016 | Rimmington | B65G 43/04 |
| 11,635,112 B2* | 4/2023 | Seminel | F16D 7/08 |
| | | | 464/46 |
| 2006/0119372 A1* | 6/2006 | Smith | G01D 5/165 |
| | | | 324/714 |
| 2021/0003213 A1* | 1/2021 | Takahashi | F16H 61/32 |
| 2021/0006194 A1* | 1/2021 | Kamio | H02P 25/22 |
| 2021/0333774 A1* | 10/2021 | Tada | G05B 19/27 |

FOREIGN PATENT DOCUMENTS

| | | | | |
|---|---|---|---|---|
| CN | 103256883 A | * | 8/2013 | ............. G01B 7/30 |
| DE | 102010005399 A1 | * | 8/2010 | ............. G01B 7/003 |
| WO | WO-2018210527 A1 | * | 11/2018 | ............. B60L 15/20 |

* cited by examiner

*Primary Examiner* — Timothy Hannon
(74) *Attorney, Agent, or Firm* — Harrity & Harrity, LLP

(57) ABSTRACT

A motor assembly, control system and associated method monitor the rotational engagement of an input shaft associated with a motor with an output shaft configured to controllably position a control surface. In this regard, a control system includes a motor assembly and an associated controller. The motor assembly includes a motor configured to rotate an input shaft and a first encoder configured to determine a rotational position of the input shaft. The motor assembly also includes an output shaft, such as a capstan, and a second encoder configured to determine a rotational position of the output shaft. The output shaft is rotatably coupled to the input shaft associated with the motor via a clutch. The controller is configured to identify slippage of the clutch based upon information provided by the first and second encoders regarding the rotational positions of the input shaft and the output shaft, respectively.

20 Claims, 5 Drawing Sheets

CONTROL SYSTEM AND METHOD TO DETECT CLUTCH SLIPPAGE

CROSS-REFERENCE TO RELATED APPLICATIONS

This application claims benefit of U.S. Provisional Application No. 63/053,355, filed Jul. 17, 2020, the entire contents of which are incorporated herein by reference.

TECHNOLOGICAL FIELD

An example embodiment relates generally to a control system and method to detect clutch slippage and, more particularly, to a control system and method for detecting clutch slippage utilizing encoders.

BACKGROUND

A motor may be operatively connected to a control surface in various manners. In some implementations, the motor is connected to a control surface via a cable that is wrapped about a capstan. The motor may include or otherwise be associated with an input shaft that is rotatably coupled to the capstan. Thus, the motor is configured to cause the capstan to controllably rotate and to correspondingly control the extension or retraction of the cable and the associated positioning of the control surface. As such, the pilot of a manually controlled aircraft or an autopilot system may provide control signals to the motor with respect to the actuation of the control surface and the motor may, in turn, cause the capstan to correspondingly rotate in order to affect the desired movement of the control surface.

The motor and, more particularly, the input shaft associated with the motor and the capstan may be connected via a clutch. The clutch may also be responsive to the control signals so as to be engaged in order to connect the input shaft associated with the motor and the capstan in an instance in which the control surface is being directed to change position. Conversely, the clutch is disengaged to disconnect the input shaft associated with the motor from the capstan in other instances in which the control surface is to be positioned independent of the motor. For example, the motor may be responsive to an autopilot system such that the clutch is engaged while the autopilot system is activated to permit the reposition the control surface, but is disengaged when the autopilot system is deactivated.

In an instance in which the clutch slips, accurate positioning of the control surface may be affected, at least to some degree. In order to detect an instance in which the clutch slips, torque sensing devices and electrical current monitoring devices have been employed. The torque sensing devices and electrical current monitoring devices are associated with the motor. In this regard, the torque sensing devices and the electrical current monitoring devices are generally associated with the drive motor, as opposed to the input shaft, so as to measure and are therefore dependent upon information, such as torque and electrical current, that is indirectly indicative of clutch slippage. As a result, the information provided by torque sensing devices and electrical current monitoring devices that is interpreted to be indicative of clutch slippage is based upon assumptions regarding the overall system which may not always be accurate under all possible operating conditions.

BRIEF SUMMARY

A motor assembly, a control system and an associated method are provided to reliably monitor the rotational engagement of an input shaft associated with a motor with an output shaft, such as a capstan, that serves to controllably position a control surface. In this regard, the motor assembly, control system and associated method directly monitor the rotational engagement of the input shaft associated with a motor with the output shaft so as to identify any discrepancies, such as brought about by clutch slippage, in an accurate manner. As such, a notification of an instance in which the clutch slips may be provided and acted upon with increased confidence that the clutch did, in fact, slip to create the discrepancy that was identified. As a result, the motor assembly, control system and associated method of an example embodiment provide for reliable notification of clutch slippage to permit remedial action to be taken in appropriate circumstances without errantly providing notifications of clutch slippage when, in fact, the clutch has not slipped.

In an example embodiment, a motor assembly is provided that includes a motor assembly configured to rotate an input shaft and a first encoder configured to determine a rotational position of the input shaft. The motor assembly also includes an output shaft and a second encoder configured to determine a rotational position of the output shaft. The motor assembly further includes a clutch configured to cause the output shaft to alternately engage the input shaft associated with the motor so as to rotate therewith and to be rotatably disengaged from the input shaft associated with the motor. The rotational positions of the input shaft and the output shaft that are determined by the first and second encoders, respectively, permit slippage of the clutch to be identified.

The motor assembly of an example embodiment also includes an axial coupler configured to operably couple the output shaft and the second encoder. In this example embodiment, the output shaft may comprise a capstan having a capstan shaft extension and the second encoder may include an encoder measurement shaft. As such, the axial coupler of this example embodiment is configured to couple the capstan shaft extension and the encoder measurement shaft.

The motor assembly of an example embodiment also includes an encoder brace configured to at least partially support the second encoder relative to the output shaft. In an example embodiment, the output shaft includes an encoder magnet for rotation therewith and the second encoder includes a rotary encoder configured to magnetically interact with the encoder magnet as the encoder magnet rotates with the output shaft. The motor assembly of an example embodiment further includes a gear box configured to rotatably connect the input shaft driven by the motor to a gear box output shaft in accordance with a predefined gear ratio. In this example embodiment, the clutch is configured to cause the output shaft to alternately engage the input shaft and to be rotatably disengaged from the input shaft by causing the output shaft to alternately engage the gear box output shaft so as to rotate therewith and to rotatably disengage from the gear box output shaft In another example embodiment, a control system is provided that includes a motor assembly and an associated controller. The motor assembly includes a motor associated with an input shaft and a first encoder configured to determine a measure of rotation of the input shaft. The motor assembly also includes an output shaft and a second encoder configured to determine a measure of rotation of the output shaft. The output shaft is rotatably coupled to the input shaft associated with the motor via a clutch. The controller is configured to identify slippage of the clutch based upon information provided by the first and second encoders regarding the measures of rotation of the input shaft and the output shaft, respectively.

The controller of an example embodiment is configured to identify slippage of the clutch in an instance in which the measures of rotation provided by the first and second encoders indicate a difference in rotation between the input shaft and the output shaft. In an example embodiment, the controller is configured to provide notification of the slippage of the clutch. The motor assembly of an example embodiment also includes the clutch configured to cause the output shaft alternately to engage the input shaft associated with the motor so as to rotate therewith and to be rotatably disengaged from the input shaft associated with the motor.

The motor assembly of an example embodiment also includes an axial coupler configured to operably couple the output shaft and the second encoder. The output shaft of this example embodiment includes a capstan having a capstan shaft extension and the second encoder includes an encoder measurement shaft. The axial coupler of this example embodiment is configured to couple the capstan shaft extension and the encoder measurement shaft. In an example embodiment, the motor assembly also includes an encoder brace configured to at least partially support the second encoder relative to the output shaft. The output shaft of an example embodiment includes the encoder magnet for rotation therewith and the second encoder includes a rotary encoder configured to magnetically interact with the encoder magnet as the encoder magnet rotates with the output shaft.

In a further example embodiment, a method of identifying slippage of a clutch is provided that includes causing, with the clutch, the output shaft to alternately engage an input shaft associated with a motor so as to rotate therewith and to be rotatably disengaged from the input shaft associated with the motor. The method also includes separately determining a measure of rotation of the input shaft associated with the motor with the first encoder and a measure of rotation of the output shaft with a second encoder. The method further includes identifying slippage of the clutch based upon the measures of rotation provided by the first and second encoders regarding the input shaft and the output shaft, respectively.

The method of an example embodiment identifies slippage of the clutch in an instance in which the measures of rotation provided by the first and second encoders indicate a difference in rotation of the input shaft associated with the motor and the output shaft. In this example embodiment, the method also includes providing notification of the slippage of the clutch. In an embodiment in which the output shaft is operably connected to a control surface, the method also includes identifying an at least partial loss of control of the control surface in response to identification of slippage of the clutch. In this example embodiment, the control surface may be carried by a vehicle and the method may also include causing control of the vehicle to be modified in response to identification of the at least partial loss of control of the control surface. In an example embodiment in which the output shaft is embodied by a capstan, the method determines the measure of rotation of the capstan by coupling a capstan shaft extension of the capstan and an encoder measurement shaft to the second encoder with an axial coupler. The method of an example embodiment also includes determining the measure of rotation of the output shaft based upon magnetic interaction between an encoder magnet of the output shaft that is configured for rotation therewith and a rotary encoder of the second encoder.

BRIEF DESCRIPTION OF THE DRAWINGS

Figure 1:
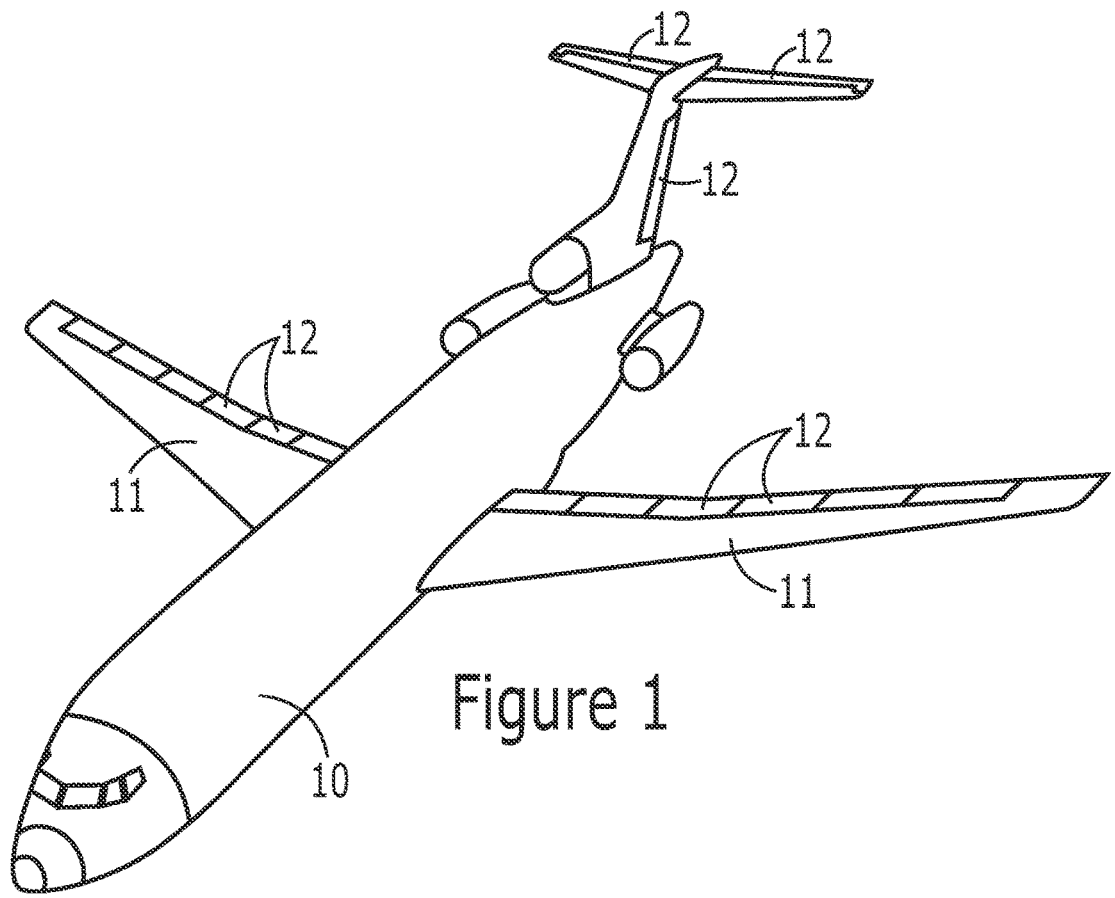
Figure 2:
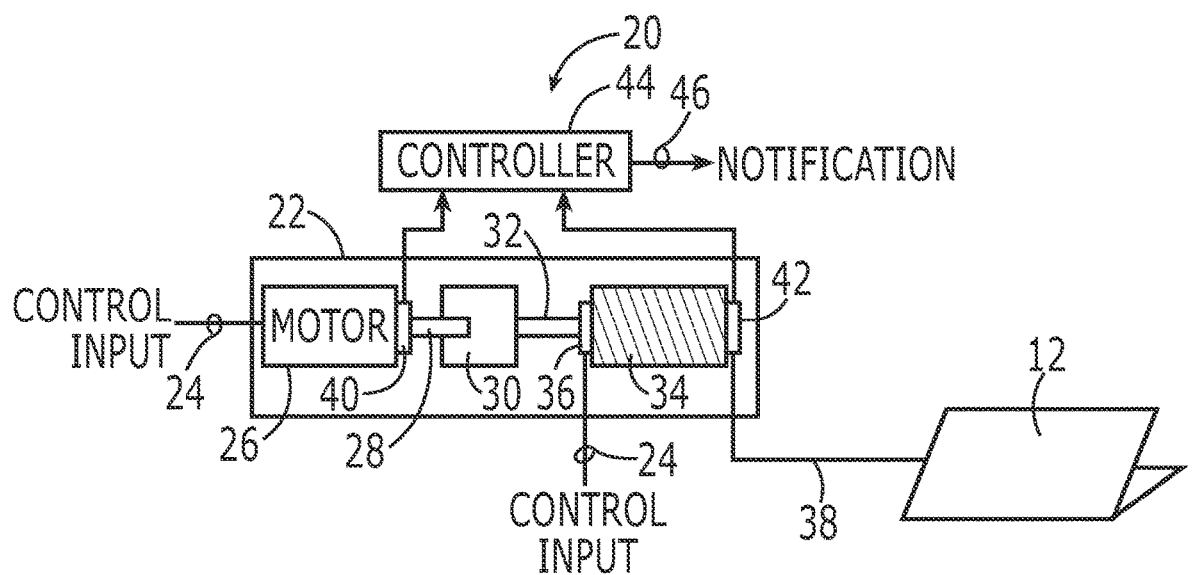
Figure 3:
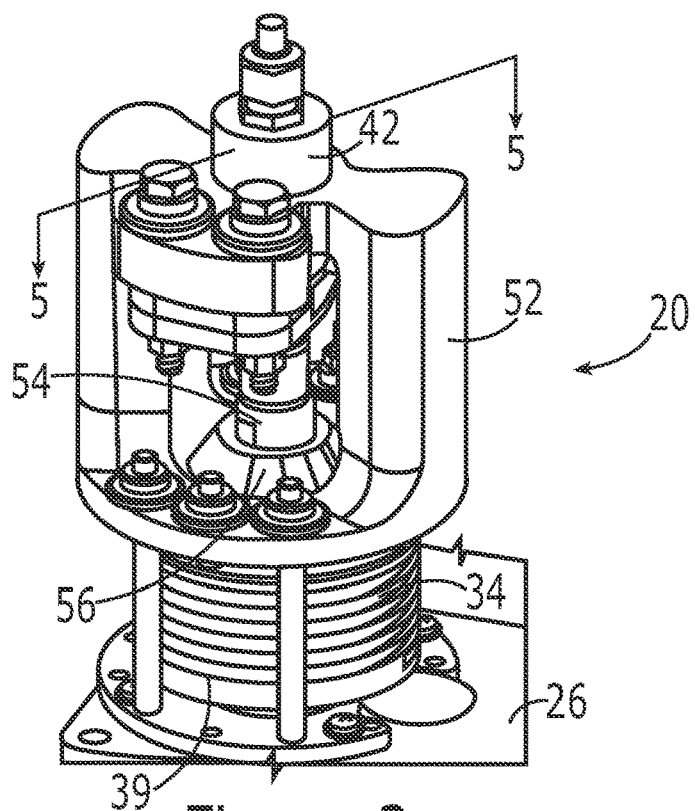
Figure 4:
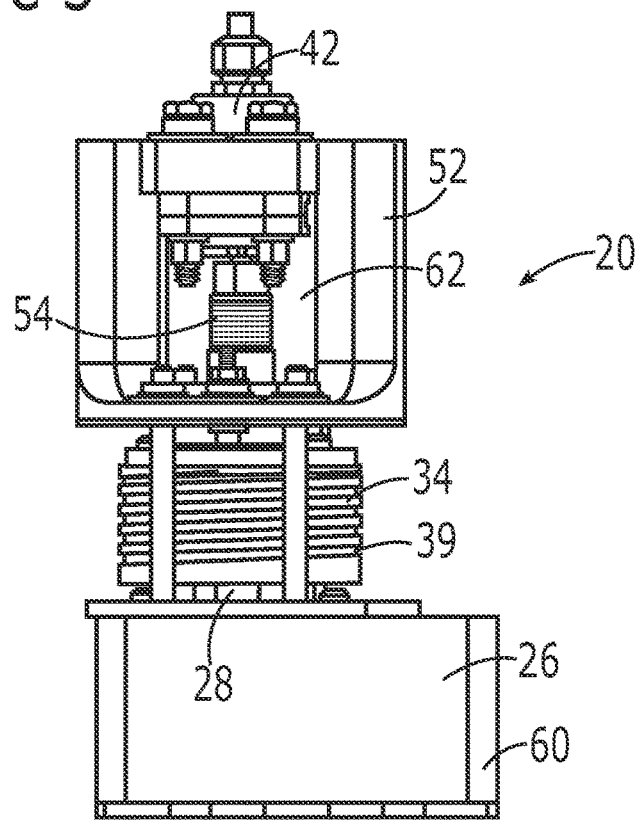
Figure 5:
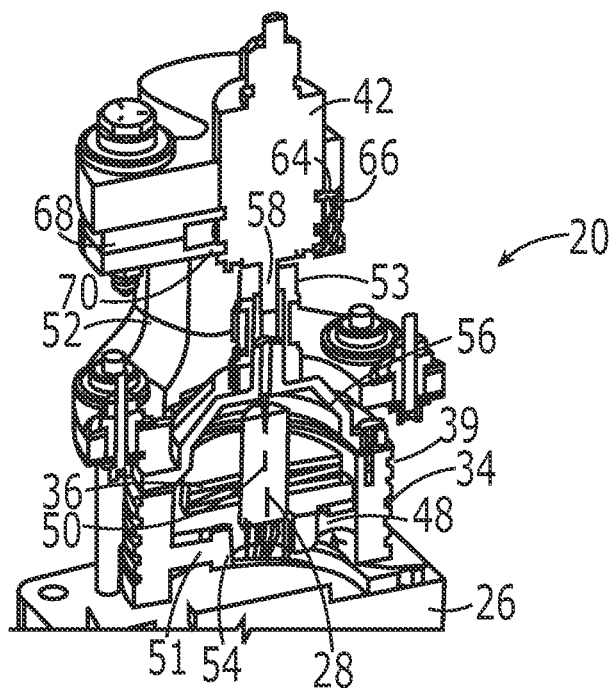
Figure 6:
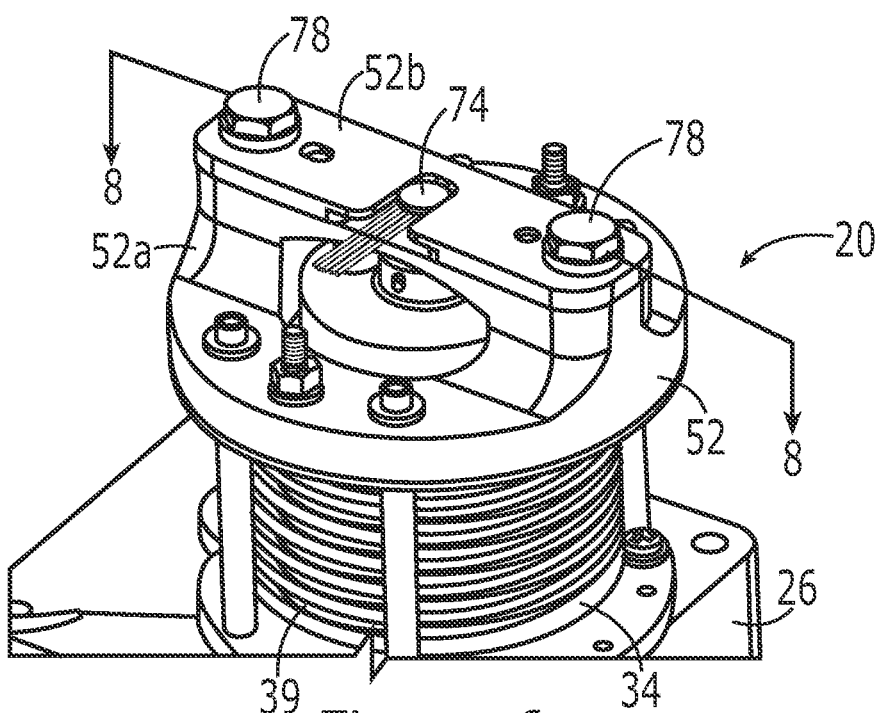
Figure 7:
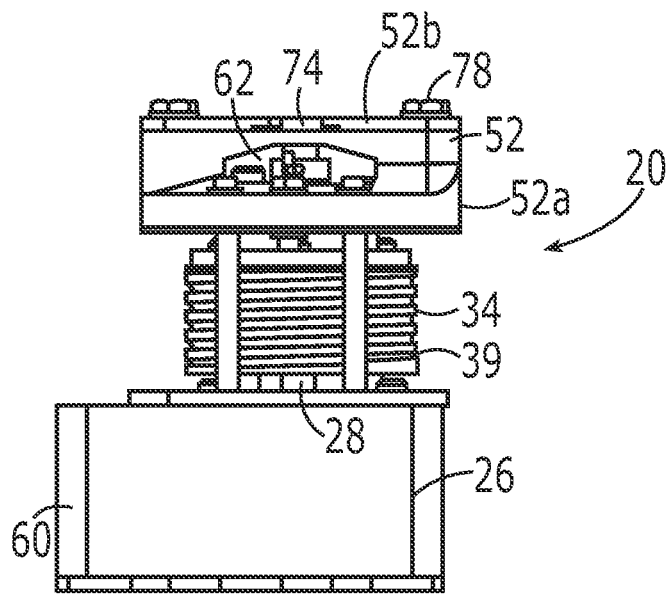
Figure 8:
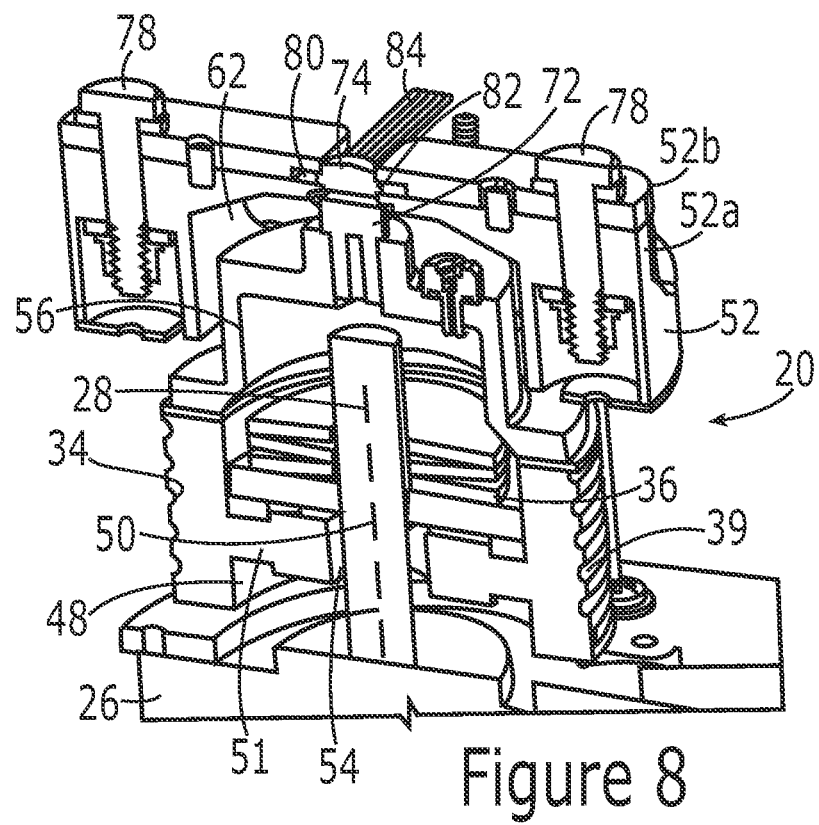
Figure 9:
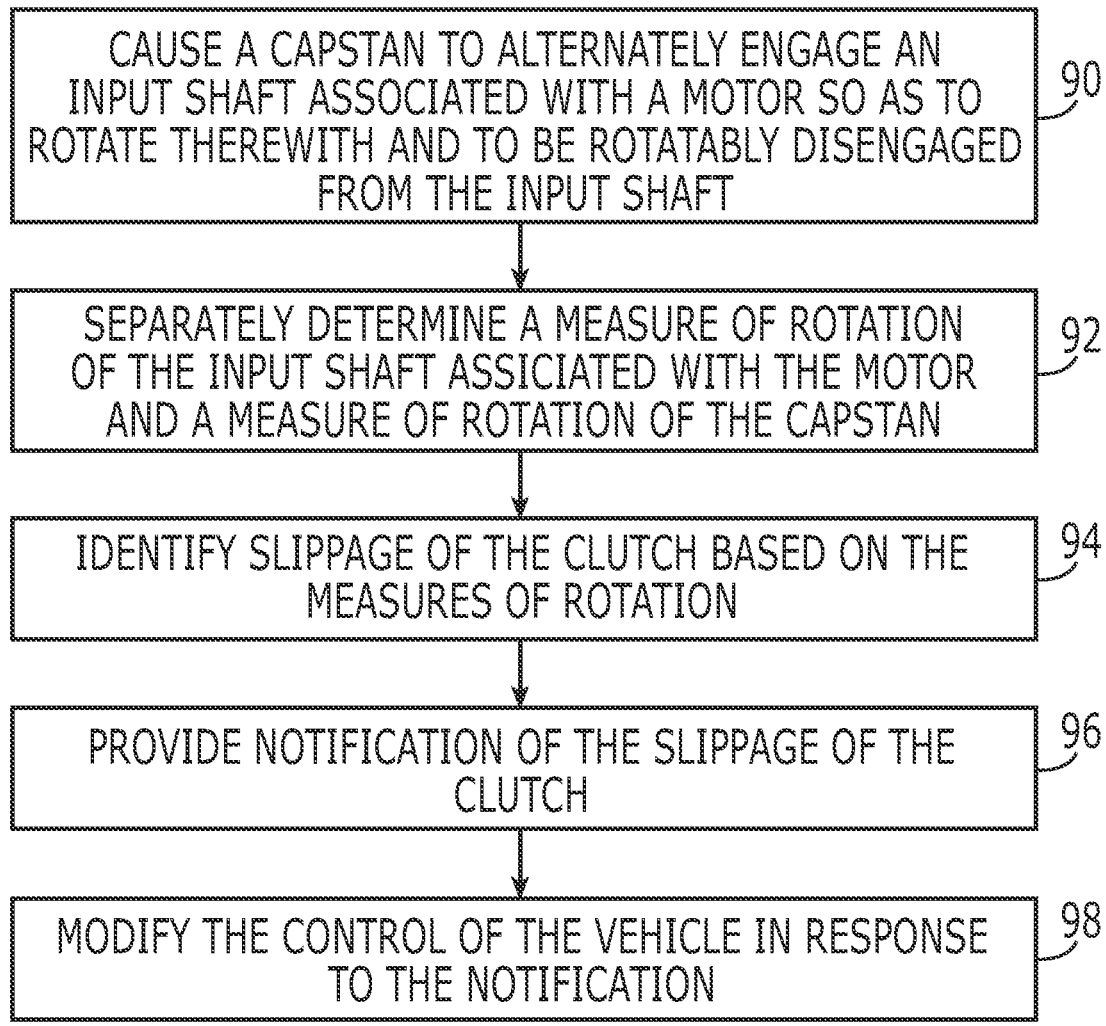

Having thus described certain example embodiments of the present disclosure in general terms, reference will hereinafter be made to the accompanying drawings, which are not necessarily drawn to scale, and wherein:

FIG. 1 is a perspective view of a portion of an aircraft including a plurality of control surfaces;

FIG. 2 is a block diagram of a control system in accordance with an example embodiment of the present disclosure;

FIG. 3 is a perspective view of a motor assembly in accordance with an example embodiment of the present disclosure;

FIG. 4 is a side view of the motor assembly of FIG. 3;

FIG. 5 is a cross-sectional view of the motor assembly of FIG. 3 taken along line 5-5 of FIG. 3;

FIG. 6 is a perspective view of a motor assembly in accordance with another example embodiment of the present disclosure;

FIG. 7 is a side view of the motor assembly of FIG. 6;

FIG. 8 is a cross-sectional view of the motor assembly of FIG. 6 taken along line 8-8 of FIG. 6; and FIG. 9 is a flowchart illustrating operations performed, such as by the control system of FIG. 2, in accordance with an example embodiment of the present disclosure.

DETAILED DESCRIPTION

The present disclosure now will be described more fully hereinafter with reference to the accompanying drawings, in which some, but not all aspects are shown. Indeed, the disclosure may be embodied in many different forms and should not be construed as limited to the aspects set forth herein. Rather, these aspects are provided so that this disclosure will satisfy applicable legal requirements. Like numbers refer to like elements throughout.

A motor assembly, a control system and a method are provided in order to monitor the rotational relationship of an input shaft associated with a motor and an output shaft, such as a capstan, that collectively serve to controllably actuate a respective control surface. The control system and the associated method can therefore identify an instance in which there is a discrepancy between the rotation of the input shaft associated with the motor and the rotation of the output shaft, such as due to the slippage of a clutch that serves to controllably engage the input shaft associated with the motor with the output shaft. Based upon the identification of a discrepancy, remedial action may be taken in a timely manner including, for example, modification of the current operations due to an at least partial lack of control over the control surface and/or the performance of maintenance activities upon the motor assembly to address the issue leading to the at least partial lack of control over the control surface.

The motor assembly, the control system and the associated method are configured to directly monitor the rotational engagement of the input shaft associated with the motor with the rotatable output shaft, such as the capstan, such that any discrepancy between the rotation of the input shaft and the output shaft may be detected with a greater degree of certainty and accuracy than other techniques that indirectly monitor for clutch slippage, such as based upon the torque provided by the motor or the electrical current drawn by the motor. Thus, the identification of a discrepancy between the rotation of an input shaft associated with the motor and the rotation of the output shaft in accordance in accordance with an example embodiment is a reliable indicator of clutch slippage within the motor assembly and the inefficiencies and uncertainties associated with false positive and false negative signals potentially generated by other techniques that monitor clutch slippage in an indirect manner are mitigated.

The motor assembly, control system and associated method may be configured to monitor the actuation of any of a variety of different control surfaces that may be utilized in various different applications installed on various different vehicles 10. As shown by way of example, but not of limitation, an exemplary vehicle 10 shown in FIG. 1 may be embodied as an aircraft 10 having a wing 11 with one or more control surfaces 12 installed thereon. While one type of aircraft 10 is depicted, the motor assembly, control system and associated method may be employed in conjunction with any of variety of different types of aircraft as well as other vehicles. Additionally, while control surfaces 12 in the form of ailerons, elevators and rudders are depicted in FIG. 1, the actuation of other types of control surfaces may be monitored including, for example, spoilers.

Regardless of the type of control surface, the control surfaces 12 are configured to be actuated, either manually or by an autopilot or other automated system. The controlled actuation of the control surfaces 12 allows for the performance of the aircraft 10 to be modified during, for example, different phases of flight, such as takeoff, cruise, landing and the like. Although illustrated in FIG. 1 in conjunction with an aircraft 10, the control surface 12 for which the actuation is monitored in accordance with an example embodiment may be the control surface of other types of vehicles, such as the control surface of a space craft, a watercraft, e.g., a boat or submarine, an automobile or other land-based vehicle or the like. Still further, the control surface 12 for which actuation is monitored need not be carried by a vehicle, but may, instead, be deployed in other applications in other example embodiments.

In accordance with an example embodiment, a control surface, such as the control surface 12 depicted in FIG. 1, is controlled by a control system. A control system 20 of one example embodiment is depicted in FIG. 2. As shown, the control system 20 includes a motor assembly 22 responsive to a control input 24, such as a manually provided control input or a control input provided by an autopilot or other automated system, in order to controllably reposition the control surface 12 in response thereto. The motor assembly 22 includes a motor 26, such as a servomotor, responsive to the control input 24 and associated with an input shaft 28. The input shaft 28 is caused to rotate by the motor 26. Although the input shaft may be directly driven by the motor in some embodiments, the motor assembly of other example embodiments includes a gear box 30 as shown in FIG. 2. The gear box 30 is configured to rotatably connect an input shaft 28 driven by the motor to a gear box output shaft 32 in accordance with a predefined gear ratio.

The motor assembly 22 further includes a rotatable output shaft and a clutch 36 configured to alternately engage and disengage the rotatable output shaft relative to the input shaft 28 associated with the motor 26. The rotatable output shaft may be embodied by a variety of devices that are configured to rotate in response to rotation of the input shaft 28 of the motor 26 and to correspondingly position a control surface. In this regard, the output shaft may be connected to the control surface 12 by a cable with rotation of the output shaft serving to extend or retract the cable that serves to position a control surface 12 as described below. Alternatively, the output shaft may be connected to the control surface 12 in other manners, such as by being directly connected to the control surface or by being connected via a mechanical linkage. Also, the rotatable output shaft may be embodied as a capstan 34. A capstan 34 is discussed below by way of example of a rotatable output shaft, but not of limitation. However, the rotatable output shaft may be alternatively embodied as a drive shaft, a wheel, a lever arm, a cam, a mechanical linkage or the like.

In an embodiment in which the rotatable output shaft is embodied by a capstan 34 and in an instance in which the clutch 36 is engaged and, in turn, the input shaft 28 associated with the motor 26 is correspondingly engaged with the capstan, rotation of the input shaft associated with the motor causes corresponding rotation of the capstan. Conversely, in an instance in which the clutch 36 is disengaged, the input shaft 28 associated with the motor 26 is correspondingly disengaged from the capstan 34 such that further rotation of the input shaft does not cause the capstan to rotate.

The control system 20 of this example embodiment also includes a cable 38 or other type of connector including those noted above (hereinafter generally referenced as a cable) connected to the rotatable output shaft, such as by being wrapped about the capstan 34. As shown in FIG. 3, for example, the exterior surface of the capstan 34 may define a groove 39 that extends helically about the capstan and the cable 38 may be wrapped about the capstan so as to extend through the groove defined by the capstan. The cable 38 of this example embodiment extends from the capstan 34 and is connected, either directly as shown in FIG. 2 or indirectly, to the control surface 12. In an example embodiment, the cable 38 is configured to alternately provide both a pushing force and a pulling force on the control surface 12. Although the cable 38 may be operably connected to and interact with the control surface 12 in various manners, both ends of the cable of one example embodiment are attached to the control surface. The cable 38 of this example embodiment extends from one side of the control surface 12, spirals within the groove 39 around the capstan 34, and returns to the other side of the control surface. As the capstan 34 spins, the cable 38 of this example embodiment pushes one side of the control surface 12 and pulls the other side of the control surface in order to rotate the control surface.

By way of another example, in response to a control input 24 that commands the control surface 12 to be further deflected, such as by being further extended so as define a greater angle relative to a surface of the wing 11, the clutch 36 may be caused to engage the capstan 34 such that rotation of the input shaft 28 associated with the motor 26 causes the capstan to correspondingly rotate and to further extend the cable 38 such that the control surface is controllably deflected. Conversely, in response to a control input 24 that commands the control surface 12 to be retracted so as define a smaller angle relative to a surface of the wing 11, the clutch 36 may be caused to engage the capstan 34 such that rotation of the input shaft 28 associated with the motor 26 causes the capstan to correspondingly rotate and to wind additional portions of the cable 38 about the capstan, thereby pulling the cable back in such that the control surface is controllably retracted. Still further, in the absence of a control input 24 (or in response to a control input indicating that no action is to be taken with respect to the control surface 12), the clutch 36 may be caused to be disengaged, or remain disengaged, from the capstan 34 such that the capstan is similarly disengaged from the input shaft 28 associated with the motor 26 and the control surface is not repositioned, even in an instance in which the motor continues to cause the input shaft to be rotated.

As noted above, the motor assembly 22 is responsive to the control input 24. In this regard, the clutch 36 of an example embodiment is responsive to the control input 24 in order to alternately engage and disengage the capstan 34 so as to rotatably connect and disconnect, respectively, the capstan and the input shaft 28 associated with the motor 26. Additionally, the motor 26 of an example embodiment is responsive to the control input 24. In this regard, the motor 26 may be activated by the control input 24 to cause rotation of the input shaft 28 or to cease rotation of the input shaft depending upon whether the control surface 12 is to be repositioned or is to remain stationary. With respect to the rotation of the input shaft 28, the motor 26 may also be responsive the control input 24 in an example embodiment in order to control the direction of rotation of the input shaft. For example, the motor 26 may be configured to cause the input shaft 28 to rotate in one direction in response to an indication by the control input 24 that the control surface 12 is to be further deflected and to rotate in the opposite direction in response to an indication by the control input that the control surface is to be retracted. Thus, the control system 20 of this example embodiment provides for a control surface 12 to be repositioned in accordance with the control input 24.

As also shown in FIG. 2, the control system 20 and, more particularly, the motor assembly 22 includes first and second encoders 40, 42, such as first and second rotary encoders, e.g., first and second micro-electromechanical system (MEMS) encoders. The motor 26 is associated with the first encoder 40, while the capstan 34 is associated with the second encoder 42. The first encoder 40 is configured to determine a measure of the rotation, such as the rotational position, of the input shaft 28 associated with the motor 26, while the second encoder 42 is configured to determine a measure of the rotation, such as the rotational position, of output shaft, e.g., capstan 34. In addition to or instead of the rotational position, the first and second encoders 40, 42 may be configured to determine various other measures of rotation including, for example, the angular velocity, the rotational speed, the rate of rotation, the number of rotations, the time required for rotation, etc. The first encoder 40 directly measures the rotation of the input shaft 28 associated with the motor 26 and the second encoder 42 directly measures the rotation of the capstan 34 such that the resulting measurements are reliable and the confidence in the action taken based thereupon is increased.

The control system 20 also includes a controller 44, such as a processor, a computing device including, for example, a flight control computer, an autopilot system, a flight management system, or the like. The controller 44 is configured to receive input from the first and second encoders 40, 42 indicative of the respective measures of rotation, e.g., rotational positions, of the input shaft 28 associated with the motor 26 and rotation of the output shaft, e.g., capstan 34, respectively, and to determine whether the motor assembly 22 is operating properly such that the control surface 12 is being positioned in the desired manner. The controller 44 is configured to determine whether the rotational positions of the motor 26 and capstan 34 remain the same (or remain related if a gearbox is used). In this regard, by utilizing two rotary encoders 40, 42 to measure the change in rotational position of a drive motor 26 and a capstan 34, the controller 44 is configured to detect slippage of the clutch 36 in an instance in which there is a measured discrepancy between the changes in rotational position of the drive motor and the capstan.

In an instance in which the motor assembly 22 is operating properly and the clutch 36 is not slipping, the rotation of the input shaft 28 associated with the motor 26 and the rotation of the capstan 34 are substantially the same. As such, an instance in which the clutch 36 is engaged and the controller 44 determines that the rotation of the input shaft 28 associated with the motor 26 and the rotation of the capstan 34 are substantially identical while the clutch is engaged, the controller determines that the motor assembly 22 is operating properly, that is, the clutch is not slipping, and that the control surface 12 is being properly controlled.

However, in an instance in which the clutch 36 is directed to be engaged and the controller 44 identifies a discrepancy between the rotation of the input shaft 28 associated with the motor 26 and the rotation of the capstan 34, such as by detecting that the motor and the capstan have different rotational positions, based upon the information provided by the first and second encoders 40, 42, respectively, the controller is configured to determine that the motor assembly 22 is not operating properly, i.e., the clutch is slipping. As a result of the improper operation of the motor assembly 22, the control surface 12 may not be properly repositioned in the manner commanded by the control input 24 such that there may be an at least partial lack of control of the control surface. In this instance, the controller 44 may be configured to provide a notification 46 as to the discrepancy, such as to a person, e.g., a pilot or crew, or to a computer system, such as an autopilot or other automated system, operating the vehicle or other carrier of the control surface 12.

As an example in which the motor 26 is directly rotatably coupled to the capstan 34, if the first encoder 40 detects (such as based on the change in rotational position over a period of time) that the motor is rotating at 10 revolutions per minute (rpm) and the second encoder 42 detects that the capstan 34 is rotating at 8 rpm, the controller 44 of an example embodiment is configured to provide a signal indicating that the clutch 36 is slipping due to the different angular velocities. Alternatively, in an example embodiment in which the motor 26 is connected to the capstan 34 via a gearbox that defines a 30:1 ratio, the controller 44 is configured to determine that the clutch 26 is not slipping in an instance in which the angular velocity of the motor 26 is thirty times the angular velocity of capstan 34. Thus, if the first encoder 40 of this example embodiment determines that the motor 26 is rotating at 300 rpm and the capstan 34 is rotating at 10 rpm, the controller 44 of this example embodiment is configured to provide a signal indicating that the clutch 36 is operating properly due to the same 30:1 ratio between the angular velocities as is established by the gearbox.

Based upon the notification 46, various remedial actions may be taken including modifications in the current operation of the vehicle or other object carrying the control surface 12 to take into account or otherwise accommodate the discrepancy that has been detected. Additionally or alternatively, the motor assembly 22, including the clutch 36, may be subjected to maintenance in order to correct the issue that led to the discrepancy. In an example in which the control surface 12 is a flap or other control surface of an aircraft 10 that is responsive to a manually provided control input 24, the notification 46 may be provided to a pilot or crew of the aircraft. Alternatively, in an instance in which the aircraft 10 carrying the control surface 12 is operating under control of an autopilot system, the notification 46 may be provided to the autopilot system. Based upon the notification 46, the pilot or autopilot system may modify the operation of the aircraft 10 to accommodate for the discrepancy noted by the controller 44 and the at least the partial lack of control of the control surface 12, such as by utilizing other control surface(s) to a greater degree. Additionally, once the aircraft 10 has landed, the aircraft may be subjected to maintenance in order to address the issue that lead to the discrepancy.

Referring to FIGS. 3-5, a motor assembly 22 of one example embodiment is depicted. As shown, the motor assembly 22 includes a motor 26 and a rotatable input shaft 28 associated therewith and extending outwardly therefrom. The input shaft 28 may be directly driven by the motor 26 or the motor may include a gear box 30 configured to operably connect the input shaft 28 driven by the motor with the gear box output shaft 32 via a predefined gear ratio established by the gear box. The motor 26 of one example embodiment may be actuated and deactuated in response to a control input 24 with actuation of the motor causing the control surface 12 to be repositioned and deactuation of the motor causing the control surface to remain in position. Alternatively, the motor of another example embodiment is not responsive to the control input 24 and the motor is, instead, configured to cause the input shaft 28 to continue to rotate. In this alternative embodiment, the control input 24 may direct the clutch 36 to either cause the input shaft 28 associated with the motor 26 and the capstan 34 to be engaged or to be disengaged.

The motor assembly 22 of FIGS. 3-5 also includes a capstan 34 that is also configured for rotation. The exterior surface of the capstan 34 of this example embodiment defines a helical groove 39 in which a cable 38 may be disposed so as to be wrapped about the capstan with one end of the cable being connected to the capstan. The capstan 34 is not independently driven, but is, instead, controllably driven by the rotation of the output shaft 28 associated with the motor 26. In this example embodiment and as shown in cross section in FIG. 5, the capstan 34 may have cylindrical shape and may define an opening 48 therein through which a central axis 50 of the capstan extends. The input shaft 28 associated with the motor 26 extends into the opening 48 defined by the capstan 34 with the input shaft of one example embodiment being positioned along the central axis 50 of the capstan. In order to facilitate this coaxial alignment of the capstan 34 and the input shaft 28 along the central axis 50 of the capstan, the capstan may include a fixture 51 within the opening 48 defined by the capstan. The fixture 51 extends radially inward from a sidewall of the capstan 34 and has a fitting 53 that defines an opening that is the same size as or slightly larger than the diameter of the input shaft 28. Thus, the input shaft 28 may extend through the opening defined by the fitting 53 in order to center the capstan 34 relative to the input shaft.

The motor assembly 22 also includes a clutch 36. A clutch 36 is configured to alternately engage the input shaft 28 associated with the motor 26 and the capstan 34 and disengage the input shaft from the capstan. In this regard, the clutch 36 may be responsive to the control input 24. In an instance in which the control input 24 indicates that the control surface 12 is to be repositioned, the clutch 36 of this example embodiment is configured to be engaged so as to rotatably couple the capstan 34 to the input shaft 28 associated with the motor 26. Conversely, in an instance in the control surface 12 is to remain stationary, such as indicated by the absence of a control input 24, the clutch 36 of this example embodiment is configured to be disengaged so as to decouple the capstan 34 from the input shaft 28 associated with the motor 26.

In an instance in which the control surface 12 is to be repositioned, the control input 24 may also indicate the manner in which the control surface is to be repositioned, such as by being further deflected or by being retracted. In response to the control input 24, the motor 26 of an example embodiment is configured to control the rotation of the input shaft 28 so as to cause the input shaft to rotate in one direction in order to further extend the cable 38 in an instance in which the control surface 12 is to be further deflected and to rotate in the opposite direction in order to cause the cable to be withdrawn and to wind upon the capstan 34 in an instance in which the control surface is to be retracted.

As shown in FIG. 2, the motor 26 also includes a first encoder 40. The first encoder 40 is configured to determine a measure of the rotation of the input shaft 28, such as the rotational position of the input shaft. Although the first encoder 40 may be configured to directly measure the rotation of the input shaft 28, such as in an instance in which the input shaft is directly driven by the motor 26, the first encoder of an alternative example embodiment is configured to measure the rotation of an gear box output shaft 32 that is directly driven by the motor and is rotatably coupled to the input shaft by a gear box 30. The information provided by the first encoder 40 of this alternative example embodiment is directly related to the rotation of the input shaft 28 by the gear ratio defined by the gear box 30. Thus, the first encoder 40 and/or the controller 44 may be configured to determine the measure of the rotation, such as the rotational position, of the input shaft 28 based upon the measurement provided by the first encoder and the gear ratio established by the gear box 30.

The motor assembly 22 of the example embodiment of FIGS. 3-5 also includes a second encoder 42 configured to determine a measure of the rotation of the capstan 34 as shown in FIG. 2, such as the rotational position of the capstan. Although the second encoder 42 can be configured in various manners and positioned relative to the capstan 34 so as to monitor the rotation of the capstan in various manners, the second encoder of an example embodiment is carried by an encoder brace 52 and is configured to rotate with the capstan. In this example embodiment, the motor assembly 22 further includes an axial coupler 54 configured to operably couple the capstan 34 and the second encoder 42. The axial coupler 54 of one embodiment operably couples the capstan 34 and the second encoder 42 such that the capstan and the second encoder rotate in unison.

The axial coupler 54 may be configured in various manners, but in the embodiment depicted in FIGS. 3-5 is a bellows coupler that is configured to couple a capstan shaft extension 56 that rotates with the capstan 34 and an encoder measurement shaft 58 that rotates with the second encoder 42. In this example embodiment, the capstan shaft extension 56 may be mechanically coupled to or otherwise mounted to the capstan 34, such as to the end of the capstan that faces away from the motor 26, such as with bolts or other mechanical fasteners, while the second encoder is constructed so as to include the encoder measurement shaft 58 extending from one end thereof. The encoder measurement shaft 58 and the capstan shaft extension 56 include respective distal ends that are configured, such as being sized and shaped, to be received and engaged by the axial coupler 54. Although the axial coupler 54 of the illustrated embodiment is bellows coupler, but the axial coupler can be embodied in different manners with the axial coupler configured to engage the encoder measurement shaft 58 and the capstan shaft extension 56 in various matters, such as by means of set screws or the like.

As shown in FIG. 3-5, the second encoder 42 may be offset from, but rotatably coupled to the capstan 34. In this regard, the encoder brace 52 is configured to at least partially support the second encoder 42 relative to the capstan 34. The encoder brace 52 may be embodied in different manners, but, in the illustrated embodiment, is fixedly mounted to the same housing, such as the motor housing 60, that carries the capstan 34. The encoder brace 52 defines an opening 62 through which the second encoder 42 as well as at least a portion of the capstan shaft extension 56 and the axial coupler 54 extend. The encoder brace 52 is configured to engage the second encoder 42 so as to support the second encoder relative to the capstan 34, while permitting the second encoder to rotate with the capstan.

In an example embodiment, the second encoder 42 may define one or more at least partially circumferential grooves 64 in the exterior surface thereof. The encoder brace 52, such as an interior surface of the encoder brace, may define one or more corresponding at least partially circumferential ridges 66 that are sized, shaped and positioned so as to engage at least a portion of the one or more grooves 64 defined by the second encoder 42, such as by engaging the grooves defined on one side of the second encoder. The encoder brace 52 of this example embodiment also includes an encoder attachment mechanism 68. Once the second encoder 42 has been positioned relative to the capstan 34 and the ridges 66 of the encoder brace 52 have engaged at least a portion of the grooves 64 defined by the second encoder, the encoder attachment mechanism 68 of this example embodiment is configured to be attached to the encoder brace 52, such as with one or more bolts or other mechanical fasteners. The encoder attachment mechanism 68 includes one or more radially inwardly extending projections 70 that engage at least a portion of the one or more grooves 64 defined by the second encoder 42, such as by engaging the opposite side of the grooves from the side engaged by the inwardly extending ridges 66 of the encoder brace 52. Thus, the second encoder 42 of this example embodiment is supported by the encoder brace 52 and the associated encoder attachment mechanism 68 relative to the capstan 34 and the motor 26, while the second encoder is still permitted to rotate with the capstan.

As described above, the motor assembly 22 including the capstan 34 of the example embodiment of FIGS. 3-5 are dependent upon a mechanical connection between the second encoder 42 and the capstan 34, such as the axial coupling of the capstan shaft extension 56 and the encoder measurement shaft 58 to ensure that the capstan and the second encoder both rotate in the same manner. In other embodiments, however, the motor assembly 22 may be configured such that the second encoder 42 is configured to monitor the rotation of the capstan 34 without being mechanically connected to the capstan. One example of such a motor assembly is depicted in FIGS. 6-8. The motor assembly 22 of this example embodiment also includes a motor 26 with an associated input shaft 28. As described above, the motor 26 may also include a gear box 30 with the input shaft 28 being rotated by the motor and the gear box output shaft 32 correspondingly being rotated at a rate defined by the gear ratio of the gear box. The motor assembly 22 also includes a capstan 34 having an exterior surface that defines a helical groove 39 through which a cable 38 connected to the control surface 12 extends such that rotation of the capstan serves to controllably position the associated control surface.

In this example embodiment, the capstan 34 also includes an encoder magnet 72 configured to rotate with the capstan 34. Additionally, the second encoder 42 of this example embodiment includes an encoder 74, such as a MEMS rotary encoder, configured to magnetically interact with the encoder magnet 72 as the encoder magnet rotates with the capstan 34 in order to detect rotation of the encoder magnet and, in turn, the capstan.

The rotary encoder 74 may be positioned so as to be magnetically coupled with the capstan magnet 72 in various manners. In an example embodiment, however, the motor assembly 22 includes a capstan shaft extension 56 as described above with the capstan shaft extension being configured to rotate with the capstan 34. The encoder magnet 72 may be carried by the capstan shaft extension 56. In the embodiment depicted in FIGS. 6-8, the end of the capstan axial extension 56 that faces away from the capstan 34 defines an opening, such as an opening aligned with the central axis 50 of the capstan. The encoder magnet 72 may be disposed within this opening and secured therein, such as with set screws or other mechanical fasteners.

In this embodiment, the rotary encoder 74 is positioned so as to be generally aligned with the encoder magnet 72, such along the central axis 50 defined by the capstan 34. In an example embodiment in which the motor assembly 22 includes an encoder brace 52 as described above, the encoder brace is configured to securely maintain the rotary encoder 74 in a fixed position in alignment with, but spaced apart from the encoder magnet 72. For example, the encoder brace 52 may be comprised of first and second portions 52a, 52b secured together by bolts 78 or other mechanical fasteners. In this example embodiment, the first and/or second portions 52a, 52b of the encoder brace 52 define a cavity 80 within which the rotary encoder 74 is disposed with the rotary encoder having a rib 82 or other feature extending radially outward that is engaged by the first and/or second portions to secure the rotary encoder within the encoder brace. In the embodiment depicted in FIGS. 6-8, the motor assembly 22 also includes one or more electrical leads 84 or other form of wireline communication to provide information collected by the second encoder 42, such as the rotary encoder 74, regarding the rotation of the capstan 34, such as for comparison by the controller 44 to the information provided by the first encoder 5 as to the rotation of the output shaft 28 associated with the motor 26.

With reference now to FIG. 9, the operations performed, such as by the control system 20 of FIG. 2, are depicted. As shown in block 90, the clutch 36 is configured to cause the capstan 34 to alternately engage the input shaft 28 associated with the motor 26 so as to rotate therewith and to be rotatably disengaged from the input shaft associated with the motor. As noted above, the clutch 36 may be controlled by a control input 24, such as provided by manual input, e.g. from a pilot or other crew member, or by an autopilot or other automated system. The clutch 36 may be engaged such as to cause the capstan 34, in turn, to engage the input shaft 28 associated with the motor 26 and to rotate therewith, such as in an instance in which the control surface 12 is to be repositioned, such as by being further deflected or by being retracted. In an example embodiment, the motor 26 is also responsive to an indication by the control input 24 as to the type of movement, such as deflection or retraction, of the control surface 12 such that the motor may alternately cause the input shaft 28 to be rotated in one direction in order to cause the control surface to be deflected and in the opposite direction in order to cause the control surface to be retracted. As also noted above, the clutch 36 may be disengaged so as to rotatably disengage the capstan 34 from the input shaft 28 associated with the motor 26, such as in an instance in which the control surface 12 is not to be repositioned and is, instead, is to remain its current position.

As shown in block 92 of FIG. 9, the method also includes separately determining a measure of rotation of the input shaft 28 associated with the motor 26, such as the rotational position or a rate of rotation, i.e., angular velocity, rotational speed, e.g., revolutions per minute, or the like, with a first encoder 40 and the measure of rotation of the capstan 34 with a second encoder 42, such as the rotational position or a rate of rotation, i.e., angular velocity, rotational speed, e.g., revolutions per minute, or the like. As described in conjunction with the embodiment FIGS. 3-5 and the alternate embodiment of FIGS. 6-8, the separate determination of the measures of rotation by the first and second encoders 40, 42 may be performed in various manners. As shown in block 94, the controller 44 of an example embodiment is also configured to identify the slippage of the clutch 36 based upon measures of rotation provided by the first and second encoders 40, 42 regarding the input shaft 28 associated with the motor 26 and the capstan 34, respectively such as in response to identification of a discrepancy therebetween. Thus, in an instance in which the clutch 36 is engaged and the capstan 34 has rotatably engaged the input shaft 28 associated with the motor 26, the information provided by the first and second encoders should indicate that the input shaft and the capstan, respectively, are rotating in concert in an instance which the clutch is operating properly and not slipping. However, in an instance in which the clutch 36 is to be engaged but is slipping, the controller 44 is configured to identify a difference between the rotation of the input shaft 28 associated with the motor 26 and the capstan 34 based upon the measures of rotation provided by the first and second encoders 40, 42, respectively.

The measure of rotation of the capstan 34 may be determined in various manners. In one example embodiment described above in conjunction with FIGS. 3-5, the capstan 34, such as a capstan shaft extension 56, may be mechanically coupled to the second encoder 42, such as an encoder measurement shaft 58 of the second encoder, such as with an axial coupler 54, such that the capstan and the second encoder rotate in unison. Alternatively, the measure of rotation of the capstan 34 may be determined based upon magnetic interaction as described above in conjunction with the embodiment of FIGS. 6-8. In this example embodiment, the magnetic interaction may be between an encoder magnet 72 configured to rotate with the capstan 34 and a rotary encoder 74 of the second encoder 42.

As shown in block 96 of FIG. 9, the controller 44 of an example embodiment is also configured to provide notification 46 of the slippage of the clutch 36, such as in an instance in which the controller identifies a discrepancy between the rotation of the input shaft 28 associated with the motor 26 and the rotation of the capstan 34. In an example embodiment, this notification 46 may be in the form of an identification of at least partial loss of control of a control surface 12 that has occurred in response of the identification of the slippage of the clutch 36. In an embodiment in which the control surface 12 is a control surface, e.g., flap, aileron, etc., of an aircraft 10, the notification 46 including, in some embodiments, the identification of a loss of at least partial control of the control surface 12 may be provided to a pilot or other crew member or to an autopilot or other automated system that is currently controlling the flight of an aircraft.

As shown in block 98 of FIG. 9 in an embodiment in which the control surface 12 is carried by a vehicle, the control of the vehicle may be modified in response to the identification of the at least partial loss of control of the control surface. For example, the operation of the vehicle may be modified so as to bring about the same or comparable performance, albeit with use of other control surfaces and without reliance upon the control surface 12 with which the clutch 36 has been identified to be slipping. Alternatively, the modification of the operation of the vehicle may involve the landing, parking or otherwise halting of movement of the vehicle until such time that the issues relating to the slippage of the clutch 36 may be repaired. Instead of modifying the control of the vehicle or in addition to modifying the control of the vehicle, the motor assembly 22 may be subjected to maintenance in order to correct the issues causing the clutch slippage.

A motor assembly 22, a control system 20 and an associated method are therefore provided to reliably monitor the rotational engagement of the input shaft 28 associated with the motor 26 with an output shaft, such as the capstan 34, that serves to controllably position a control surface 12. By directly monitoring the rotational engagement of the input shaft 28 associated with the motor 26 with the output shaft, such as the capstan 34, the motor assembly 22, control system 20 and associated method identify any discrepancies, such as brought about by clutch slippage, in an accurate manner. As a result, the motor assembly 22, control system 20 and associated method of an example embodiment provide for reliable notification of clutch slippage to permit remedial action to be taken in appropriate circumstances without errantly providing notifications of clutch slippage when, in fact, the clutch 36 has not slipped.

Many modifications and other aspects of the disclosure set forth herein will come to mind to one skilled in the art to which this disclosure pertains having the benefit of the teachings presented in the foregoing descriptions and the associated drawings. For example, the rotatable cable positioning mechanism may be embodied by any of a variety of devices including, but not limited to a capstan 34 as indicated above. Therefore, it is to be understood that the disclosure is not to be limited to the specific aspects disclosed and that modifications and other aspects are intended to be included within the scope of the appended claims. Although specific terms are employed herein, they are used in a generic and descriptive sense only and not for purposes of limitation.

That which is claimed:

1. A motor assembly comprising:
a motor configured to rotate an input shaft and a first encoder configured to determine a rotational position of the input shaft;
an output shaft and a second encoder configured to determine a rotational position of the output shaft, wherein the output shaft comprises a capstan;
a cable or connector wrapped about the capstan and configured to position a control surface in response to rotation of the capstan; and
a clutch configured to cause the output shaft to alternately engage the input shaft associated with the motor so as to rotate therewith and to be rotatably disengaged from the input shaft associated with the motor,
wherein the rotational positions of the input shaft and the output shaft that are determined by the first and second encoders, respectively, permit slippage of the clutch to be identified.

2. The motor assembly according to claim 1 further comprising an axial coupler configured to operably couple the output shaft and the second encoder.

3. The motor assembly according to claim 2 wherein the capstan has a capstan shaft extension and the second encoder comprises an encoder measurement shaft, and wherein the axial coupler is configured to couple the capstan shaft extension and the encoder measurement shaft.

4. The motor assembly according to claim 1 further comprising an encoder brace configured to at least partially support the second encoder relative to the output shaft.

5. The motor assembly according to claim 1 wherein the output shaft comprises an encoder magnet for rotation therewith and the second encoder comprises a rotary encoder configured to magnetically interact with the encoder magnet as the encoder magnet rotates with the output shaft.

6. The motor assembly according to claim 1 further comprising a gear box configured to rotatably connect the input shaft driven by the motor to a gear box output shaft in accordance with a predefined gear ratio, wherein the clutch is configured to cause the output shaft to alternately engage the input shaft and to be rotatably disengaged from the input shaft by causing the output shaft to alternately engage the gear box output shaft so as to rotate therewith and to rotatably disengage from the gear box output shaft.

7. A control system comprising:
a motor assembly comprising:
a motor associated with an input shaft and a first encoder configured to determine a measure of rotation of the input shaft; and
an output shaft and a second encoder configured to determine a measure of a rotation of the output shaft, wherein the output shaft is rotatably coupled to the input shaft associated with the motor via a clutch, and wherein the output shaft comprises a capstan; and
a cable or connector wrapped about the capstan and configured to position a control surface in response to rotation of the capstan; and
a controller configured to identify slippage of the clutch based upon the measures of rotation provided by the first and second encoders.

8. The control system according to claim 7 wherein the controller is configured to identify slippage of the clutch in an instance in which the measure of rotation provided by the first and second encoders indicate a difference in rotation between the input shaft and the output shaft.

9. The control system according to claim 7 wherein the controller is configured to provide notification of the slippage of the clutch.

10. The control system according to claim 7 wherein the motor assembly further comprises the clutch configured to cause the output shaft to alternately engage the input shaft associated with the motor so as to rotate therewith and to be rotatably disengaged from the input shaft associated with the motor.

11. The control system according to claim 7 wherein the motor assembly further comprises an axial coupler configured to operably couple the output shaft and the second encoder.

12. The control system according to claim 11 wherein the capstan has a capstan shaft extension and the second encoder comprises an encoder measurement shaft, and wherein the axial coupler is configured to couple the capstan shaft extension and the encoder measurement shaft.

13. The control system according to claim 7 wherein the motor assembly further comprises an encoder brace configured to at least partially support the second encoder relative to the output shaft.

14. The control system according to claim 7 wherein the output shaft comprises an encoder magnet for rotation therewith and the second encoder comprises a rotary encoder configured to magnetically interact with the encoder magnet as the encoder magnet rotates with the output shaft.

15. A method of identifying slippage of a clutch comprising:
with the clutch, causing an output shaft comprising a capstan to alternately engage an input shaft associated with a motor so as to rotate therewith and to be rotatably disengaged from the input shaft associated with the motor, wherein rotation of the capstan causes a cable or connector wrapped thereabout to position a control surface;
separately determining a measure of rotation of the input shaft associated with the motor with a first encoder and a measure of rotation of the output shaft with a second encoder; and
identifying slippage of the clutch based upon the measures of rotation provided by the first and second encoders regarding the input shaft and the output shaft, respectively.

16. The method according to claim 15 wherein identifying slippage of the clutch comprises identifying slippage of the clutch in an instance in which the measures of rotation provided by the first and second encoders indicate a difference in rotation of the input shaft associated with the motor and the output shaft.

17. The method according to claim 15 wherein the output shaft is operably connected to the control surface, and wherein the method further comprises identifying an at least partial loss of control of the control surface in response to identification of slippage of the clutch.

18. The method according to claim 17 wherein the control surface is carried by a vehicle, and wherein the method further comprises causing control of the vehicle to be modified in response to identification of the at least partial loss of control of the control surface.

19. The method according to claim 15 further comprising determining the measure of rotation of the capstan by coupling a capstan shaft extension of the capstan and an encoder measurement shaft of the second encoder with an axial coupler.

20. The method according to claim 15 further comprising determining the measure of rotation of the output shaft based upon magnetic interaction between an encoder magnet of the output shaft that is configured for rotation therewith and a rotary encoder of the second encoder.

* * * * *